United States Patent [19]

Woyski et al.

[11] Patent Number: 4,635,764
[45] Date of Patent: Jan. 13, 1987

[54] DAMPED REACTION BASE FOR VIBRATION TESTER

[75] Inventors: William B. Woyski, Whittier; Bruce L. Huntley, Diamond Bar; Robert C. Tauscher, Hacienda Heights, all of Calif.

[73] Assignee: Team Corporation, South El Monte, Calif.

[21] Appl. No.: 614,647

[22] Filed: May 29, 1984

[51] Int. Cl.⁴ ................................................ F16F 9/30
[52] U.S. Cl. ..................................... 188/268; 248/566; 267/140.3
[58] Field of Search ................ 188/268, 381; 248/562, 248/566, 638; 267/140.1, 140.3, 140.4, 141, 141.1

[56] References Cited

U.S. PATENT DOCUMENTS

| | | | |
|---|---|---|---|
| 2,732,040 | 1/1956 | De Vost et al. | 188/268 |
| 3,469,809 | 9/1969 | Reznick et al. | 188/268 X |
| 3,491,857 | 1/1970 | Reed | 188/268 X |
| 4,004,794 | 1/1977 | Jarret et al. | 188/268 X |
| 4,509,730 | 4/1985 | Shtarkman | 267/140.3 X |

*Primary Examiner*—Duane A. Reger
*Attorney, Agent, or Firm*—Christie, Parker & Hale

[57] ABSTRACT

A reaction base for supporting a mechanical vibrator used to shake test components, the base having parallel spaced beams clamped between top and bottom plates. End plates enclose the spaces between the beams, the spaces being filled with dry particulate matter. Inflatable bladders in each space are inflated after assembly of the base to compress the particulate matter against the confining surfaces of the beams, end plates, and top and bottom plates.

10 Claims, 5 Drawing Figures

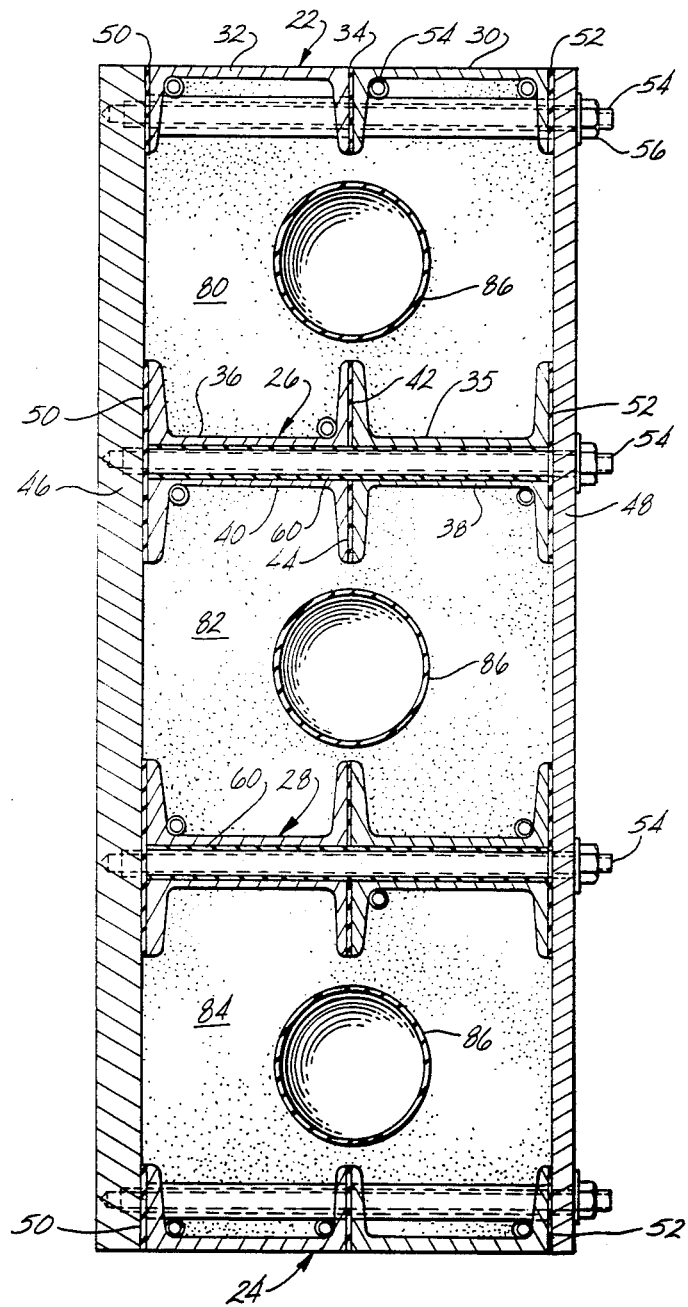

DAMPED REACTION BASE FOR VIBRATION TESTER

FIELD OF THE INVENTION

This invention relates to vibration testing apparatus and, more particularly, to a reaction base on which such vibration apparatus is mounted.

BACKGROUND OF THE INVENTION

Vibration testing of components such as electronic equipment used in aircraft and rockets, for example, is well-known. A common type of vibration testing equipment involves a shaker table on which the component to be tested is mounted. The shaker table is then oscillated along a horizontal axis, for example, at a selectable frequency by a mechanical oscillator or exciter. The oscillating table is supported on a type of bearing surface which allows the table to oscillate relative to a supporting base. The mechanical oscillator is also mounted on this same base.

Such a horizontal vibrator forms a dynamic system in which each component affects the vibration level to which the test article is subjected. At certain frequencies of the mechanical oscillator, the vibration level or displacement amplitude of the shaker table and test article may diminish due to the dynamic properties of the exciter and/or the reaction base on which the exciter is mounted. Because the base is not a perfectly rigid mass, bending oscillations may be set up in the reaction base by the exciter in such a way that the test article remains almost stationary while the mechanical oscillator and reaction base oscillate relative to the test article.

SUMMARY OF THE INVENTION

The present invention is directed to an improved design of the reaction base for a vibration tester which reduces the effect of reaction base resonances on the vibration level of the test article. In the past, it has been the practice to make the reaction base from a large slab of concrete, metal, or other heavy rigid structure. A slip plate base and the exciter for driving the slip plate are bolted to the reaction base. A large mass is required to counteract the reaction force of the exciter. However, it was found that forces on the slab produced resonances which were within the frequency range of the vibration exciter. A longitudinal bending mode which resonated at the drive frequency of the exciter produces a motion of the exciter that tends to cancel out the motion produced by the exciter on the slip table.

The present invention provides a reaction mass design in which the troublesome resonance modes are effectively damped out. The design is very stiff along the excitation axis to reduce bending deflections and increase the resonant frequency.

In brief, the present invention provides a reaction base having metal beams extending parallel to the axis of motion of the slip plate of the vibration tester. Top, bottom, end and side plates are bolted to the beams to form a rigid structure having compartments between the beams. The beams are made up of channel sections which have frictional interfaces that tend to damp out bending vibrations within the beams. The compartments are filled with dry particulate matter such as sand. A bladder is immersed in the sand in each compartment and inflated after the reaction base is assembled to compress the particulate matter against the surrounding interior surfaces of each compartment. The contact between the particulate matter and the surrounding structural members damps any vibrations of the structural framework of the reaction base.

DESCRIPTION OF THE DRAWINGS

For a better understanding of the invention, reference is made to the accompanying drawings, wherein:

FIG. 5 is a sectional view taken on the line 5—5 of FIG. 3.

DETAILED DESCRIPTION

Figure 1:
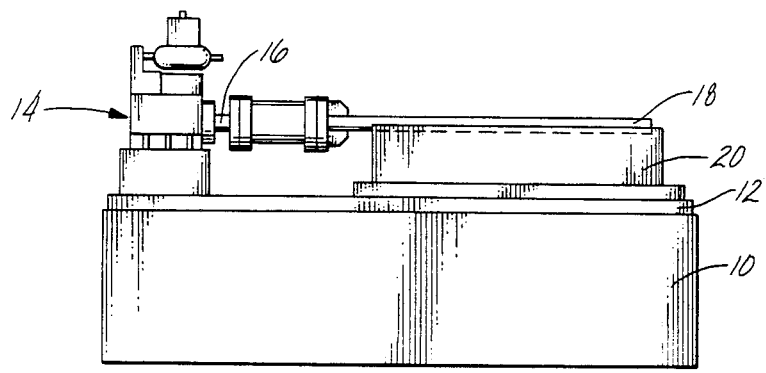
FIG. 1 is an elevational view of a vibration tester.
Figure 2:
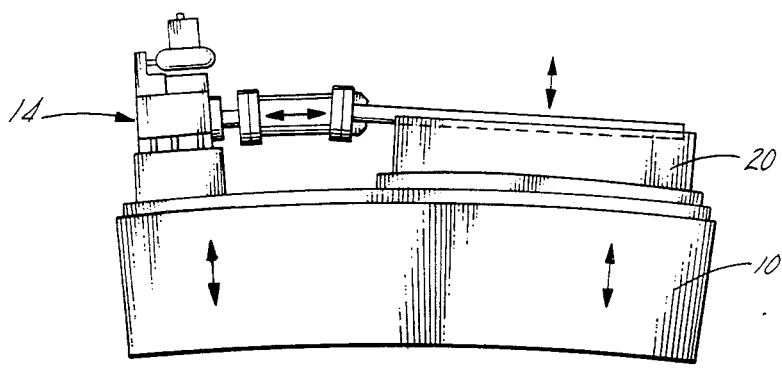
FIG. 2 shows the vibration tester subject to bending mode excitation.

Referring to FIGS. 1 and 2, there is shown a typical horizontal vibration testing system which includes a base 10 that serves as a reaction mass. The base 10 may be mounted or supported on an air cushion or other suitable support (not shown) which isolates the testing system from other structures. On top of the reaction mass is a mounting plate 12 on which is bolted or otherwise secured an exciter 14 having an output shaft 16 coupled along a horizontal axis to a slip plate 18. The exciter produces oscillation of the shaft 16 in an axial direction at a selectable frequency and amplitude in a range, for example, of up to 400 or 500 Hertz. The slip plate 18 is supported by suitable bearing means for movement laterally along the longitudinal axis of the shaft 16, the bearing means being part of a slip plate base 20 which is also bolted or otherwise secured to the reaction mass plate 12. Components under test are secured to the top of the slip plate and are then vibrated laterally in a horizontal direction as viewed in FIG. 1 by the exciter 14.

The reaction forces on the exciter in driving the slip plate are transferred to the reaction mass. Because the reaction mass of the exciter and base is very much larger than the mass of the slip plate and component under test, the reaction mass normally experiences relatively little motion compared to the component under test. However, in performing horizontal vibration tests of this type, it has been noted that at certain frequencies the vibration level of the component under test may become very much less than the output of the exciter. The nature of this problem can be explained in part by the dynamic behavior of the reaction base. As shown in FIG. 2, the reaction base can bend in such a way that the test article is left standing still and the exciter is moving. FIG. 2 shows the problem at the first bending mode frequency of the reaction base, but other resonant modes of the reaction base may present a problem.

Figure 3:
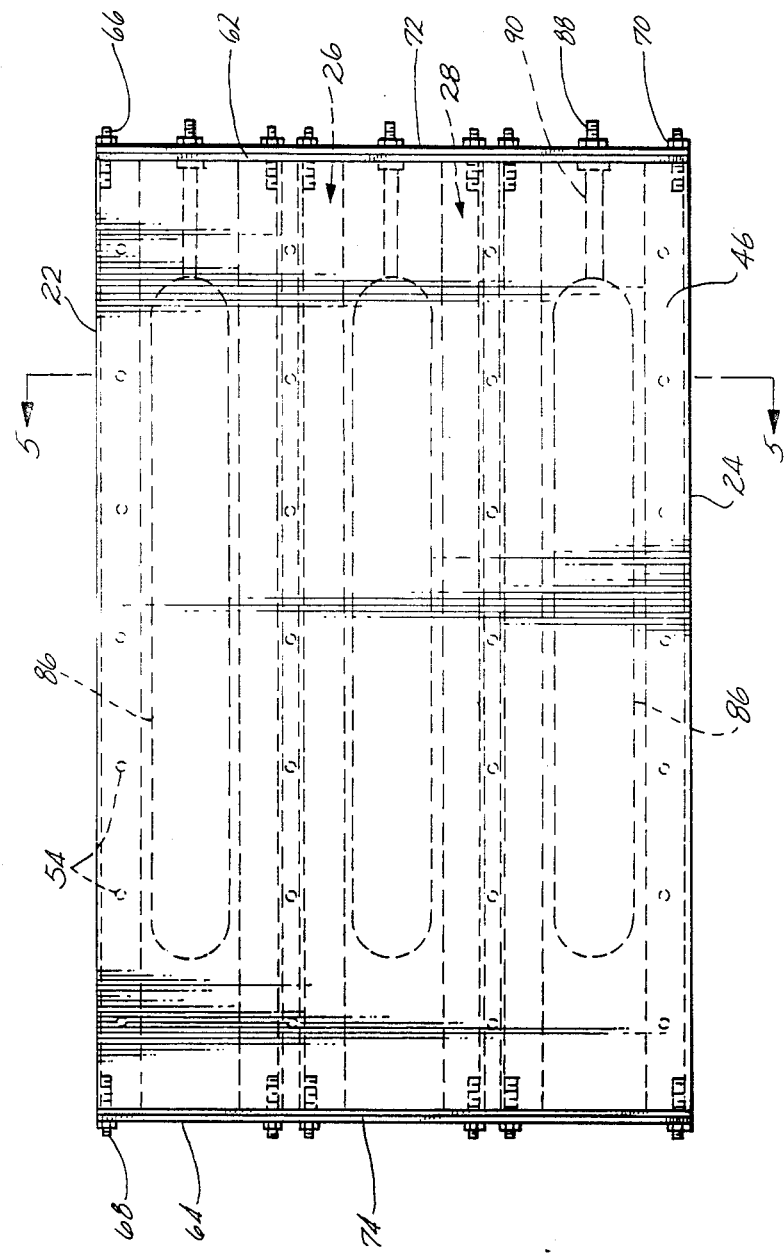
FIG. 3 is a plan view of a reaction base.
Figure 4:
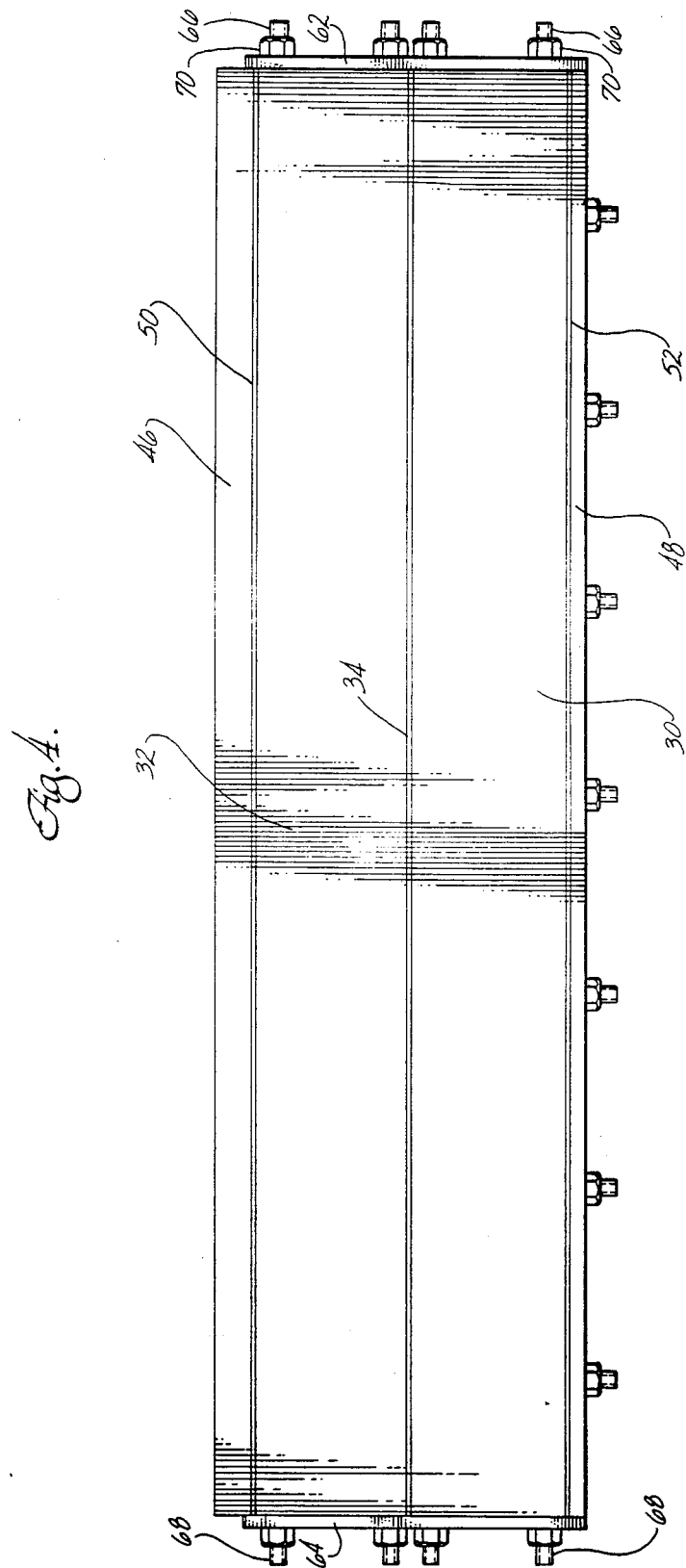
FIG. 4 is a side view of the reaction base of FIG. 3.

The reaction base 10 according to the present invention is constructed in the manner shown in FIGS. 3-5. The reaction base includes four rigid parallel beams, including a pair of outer beams, indicated at 22 and 24, and a pair of inner beams 26 and 28. Each of the outer beams is constructed of a pair of channel members 30 and 32 extending lengthwise of the reaction base and positioned one on top of the other. A gasket 34 at the interface between the two channels provides friction damping of any relative movement between the channel members. The inner channels 26 and 28 are each constructed of four channel members, as indicated at 35, 36, 38, and 40. Gaskets 42 and 44 are provided at the interfaces between the upper and lower pairs of channel members.

An upper plate 46 and a lower plate 48 are held in spaced parallel relationship by the four beams, and gaskets are provided at the interfaces between the channel members of the beams and the upper and lower plates, as indicated at 50 and 52. The channel members of the beams are clamped together between the upper and lower plates by a plurality of studs, indicated at 54. The studs preferably are threaded into the upper plate 46 and project through holes in the lower plate 48. Nuts 56 are threaded onto the studs and tightened to clamp the upper and lower plate and channels together in a rigid structure. Each of the studs 54 is preferably surrounded by a rubber tube 60 where they pass through or between the respective channel members.

Removable end plates 62 and 64 are bolted to the ends of the beams by a plurality of studs, indicated respectively at 66 and 68. The studs are preferably welded to the channel members of the beams adjacent each end of the beams, and nuts 70 are threaded onto the studs to secure the end plates securely in place. Gaskets, indicated at 72 and 74, seal the interfaces between the end plates and the ends of the beams and edges of the upper and lower plates.

It will be seen that the four beams divide the interior of the reaction base into three elongated chambers, indicated at 80, 82 and 84. Positioned in each chamber is an air bladder in the form of an elongated inflatable tube 86 sealed at both ends. These air bladders, which are installed in a deflated condition, are inflatable from the outside of the reaction base by means of connector and valve fittings 88 mounted in the end plate 62 with connecting tubes 90 extending from the respective fittings to the air bladders 86.

With the air bladders deflated, the chambers 80, 82 and 84 are packed with sand or other suitable dry, inert particulate matter. The interior is then sealed by bolting on the end plate 64. The air bladders are then inflated to increase their volume and to press the particulate matter against the confining interior surfaces forming the three chambers. The tubes preferably are somewhat elastic so they expand under pressure. The particulate matter not only increases the mass of the reactive base, but by being compressed against the surfaces of the structural members, acts as a damping agent for absorbing energy and damping the vibrations of the reaction base framework.

From the above description, it will be seen that the invention provides a rigid structural mass which is highly resistant to resonant vibrations in any mode. The channel beams provide maximum stiffness in order to minimize bending deflections and raise the resonant frequencies. The structure is extremely well damped to prevent both global and local resonances. These advantages are achieved by using multiple beams with a high moment of inertia-to-weight ratio in the longitudinal direction. Damping is provided by using a bolted construction to assemble the structure, allowing a number of interfaces which move slightly relative to each other when the structure is vibrating. Gasket material at these interfaces provides visco-elastic damping oscillatory systems. The particulate matter, being compressed against the surfaces of all the structural members, absorbs energy from any vibrational movement of the structural members, thus damping out any induced vibrational resonances in the reaction base.

While the preferred embodiment of the invention has been described as a reaction base of a vibration tester, the present invention has general application to vibration damping. For example, optical benches require isolation from vibrations introduced through the supporting structure. Machine tool tables and drive shaft supports are just a few examples of situations where vibrational damping employing the concepts of the present invention could be used. It is to be understood that what has been described is merely illustrative of the principles of the invention and that numerous arrangements in accordance with this invention may be devised by one skilled in the art without departing from the spirit and scope thereof.

What is claimed is:

1. A damped structural unit subject to externally induced vibrations, comprising a rigid framework having open spaces, an outer rigid skin secured to the framework and fully enclosing said open spaces in the framework, the framework and outer skin forming a rigid unitary structure of fixed volume, solid particulate matter enclosed in said spaces, and flexible inflatable means immersed in said particulate matter, said means when inflated expending to compress the particulate matter against the surrounding surfaces of the framework and outer skin.

2. Apparatus of claim 1 further including means for connecting the inflatable means to an external source of fluid under pressure for inflating said inflatable means after being immersed in said particulate matter.

3. Apparatus of claim 1 wherein the framework comprises a plurality of spaced parallel rigid beams.

4. Apparatus of claim 2 wherein the framework comprises a plurality of spaced parallel rigid beams.

5. Apparatus of claim 3 wherein each of said rigid beams includes at least two structural members having flat parallel surfaces forming edges of the members, and means clamping the structural members edge to edge.

6. Apparatus of claim 5 further including a layer of frictional damping material positioned between the adjoining edge surfaces of structural members.

7. A reaction base for a horizontal type vibration tester, comprising:
a plurality of parallel rigid beams having spaces between the beams, top and bottom rigid plates, means for clamping the beams between the top and bottom plates, end plates secured to opposite ends of the beams, the beams and plates forming a rigid unitary structure, particulate material filling said spaces between the beams, and at least one inflatable bag in each space for compressing the surrounding particulate material against the interior surfaces of the beams and plates within the associated space.

8. Apparatus of claim 7 wherein each beam comprises a plurality of structural members, the structural members having interfaces that are parallel with the top and bottom plates, and friction material positioned between the adjoining surfaces of said interfaces and between the structural members and the top and bottom plates.

9. Apparatus of claim 8 further including means for connecting the bags to an external source of fluid under pressure for inflating said bags after being immersed in said particulate matter.

10. Apparatus of claim 8 further including means for connecting the bags to an external source of fluid under pressure for inflating said bags after being immersed in said particulate matter.

* * * * *